April 23, 1940.   B. F. HAZELTON, JR., ET AL   2,198,578
DOUBLE GLAZING
Original Filed Nov. 6, 1935
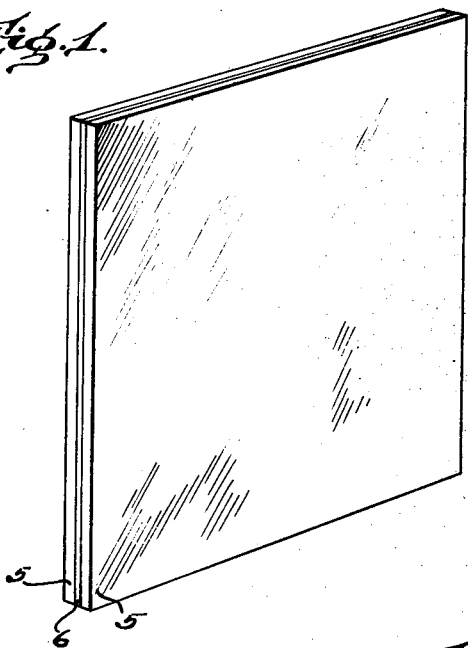
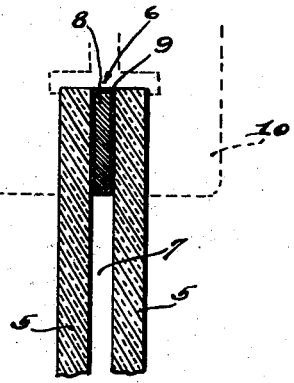
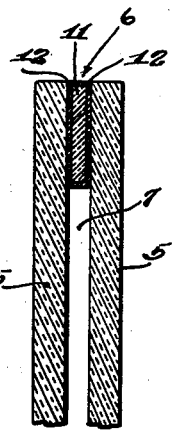
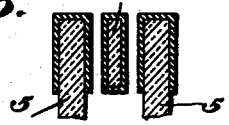
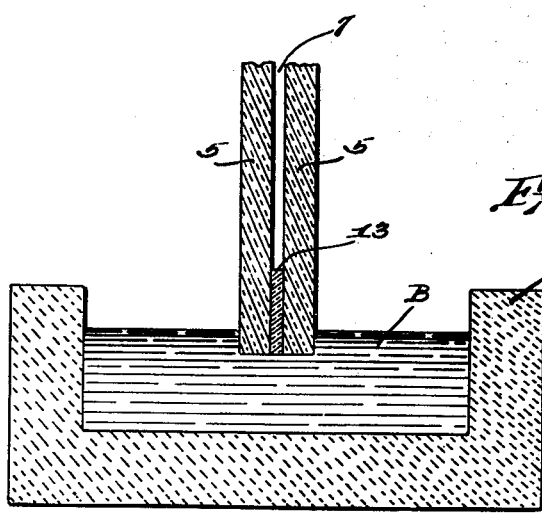
INVENTORS
B. F. Hazelton, Jr.,
W. P. Zimmerman,
M. K. Holmes.
BY Rule & Hoge
ATTORNEYS Patented Apr. 23, 1940

2,198,578

UNITED STATES PATENT OFFICE 2,198,578

DOUBLE GLAZING

Benjamin F. Hazelton, Jr., Toledo, Ohio, and Willard P. Zimmerman and Minot K. Holmes, Muncie, Ind., assignors to Owens-Illinois Glass Company, a corporation of Ohio Application November 6, 1935, Serial No. 48,542
Renewed August 2, 1938

2 Claims. (Cl. 20—56.5)

Our invention relates to double glazing in which two parallel flat sheets of glass spaced a short distance apart are secured together along their marginal portions by a suitable material which creates a hermetical seal. The invention is particularly adapted for use in windows, windshields, partitions, etc.

It is especially important in double glazing of this character that a hermetical seal be provided which will positively prevent leakage of air or moisture under all weather conditions and temperature variations to which the article is subjected in use. The primary object of our invention is the provision of an article capable of satisfactorily meeting this requirement.

The present invention aims to provide exceptionally effective means for uniting the flat glass sheets, and to this end involves the use of metallized spacer strips wherein the metal coating is of a character to create a permanent bond between the spacers and sheets when subjected to heat treatment.

A further object of the present invention is the provision of a novel method of securing two flat glass sheets together in parallel spaced relation. To this end, metallized spacers are interposed between the marginal portions of the glass sheets and these marginal portions including the spacers are then subjected to heat treatment such for example as dipping these portions into a molten metal which will not adhere to the glass or by passing the article through a high frequency induction furnace whereby the metal coating on the spacers is melted and caused to create a hermetic seal between the spacers and glass sheets.

It is also an object to unite two flat glass sheets by interposing between the marginal portions thereof, spacers in the form of glass strips and effecting a permanent bond between the spacers and sheets by dipping said marginal portions and strips into a bath of molten metal which will function solely to quickly heat and soften the spacers and adjacent portions of the sheets so that upon cooling they will become bonded together.

A further object is the provision in double glazing of means whereby a combined chemical and mechanical bond between the glass sheets and spacers may be obtained.

Other objects will be in part apparent and in part pointed out hereinafter.

In the drawing:

Fig. 1 is a perspective view showing two flat glass sheets united in accordance with the present invention.

Fig. 2 is a fragmentary sectional view showing two glass sheets spaced apart by a metallized metal spacer.

Fig. 3 is a view similar to Fig. 2, illustrating the use of a metallized glass spacer.

Fig. 4 is a fragmentary sectional view showing one marginal portion of the assembled sheets and a plain glass spacer projecting into a bath of molten metal.

Fig. 5 is a fragmentary sectional view of another form of the invention.

Referring to the drawing (Figs. 1 and 2) we have shown a composite structure comprising two parallel flat sheets 5 of glass spaced apart a short distance. A spacer 6 or gasket is secured to the inner faces of the sheets along their marginal portions in such fashion that a hermetically sealed chamber 7 is provided. To this end the spacer 6 (Fig. 2) assumes the form of a flat metal strip 8 of brass, bronze or other suitable metal having a considerably higher melting point than the coating 9 or film which is applied to the surfaces of the strip for contact with the flat sheets 5. These surfaces may be coated by dipping the strip into a bath of molten metal which may be aluminium, aluminium silicon alloy or like metal which melts at a considerably lower temperature than the strip 8 and readily "wets" the surface to which it is applied. It has been discovered that aluminium and aluminium alloy, including from seven to twelve per cent silicon, not only has a comparatively low melting point, but possesses the desirable characteristic of effectively "wetting" those surfaces of the sheets 5 in proximity to the spacers 6. By "wetting" is meant the extent to which the molten metal tends to spread out and create a continuous unbroken film over the surface with which it is brought into contact. It has been found that upon heating the marginal portions of the glass sheets to a sufficiently high temperature, the aluminium or aluminium alloy is melted and creates a combined chemical and mechanical bond between the glass sheets and spacer and that a hermetical seal is formed about the edge portions of the structure.

In practice, the glass sheets and spacers will be assembled in substantially the manner illustrated in Fig. 2 and held so assembled by clamps 10, after which the structure will be heated in any preferred manner to accomplish the bonding together of the elements as and for the purpose just described. Thus it is apparent that we employ a metallized spacer for the two-fold purpose of holding the sheets of glass in definite spaced relation and creating a seal about the marginal portions of the sheets whereby a hermetically sealed chamber is provided between said sheets.

In Fig. 3 the structure differs from that just described only to the extent that the spacer 6 consists of a flat glass strip 11 metallized on two opposed surfaces with a coating 12 of aluminium, aluminium alloy, or some other like metal possessing amphoteric properties and the necessary characteristic of readily and completely "wetting" a surface with which it is brought into contact. In this instance the sheets 5 may be preheated sufficiently to melt the aluminium coating 12 when they are pressed into contact therewith. The assembled structure while under pressure is then allowed to cool and thereby effect a permanent combined chemical and mechanical bond between the several elements.

In Fig. 4 we have shown the flat glass sheets 5 spaced apart by a spacer 13 of glass which is not coated in any fashion. These elements are clamped together and thereafter the marginal portions are dipped into a bath B of molten metal (lead for example) which will not adhere to the glass, but functions satisfactorily to quickly heat and soften the marginal portions of said elements sufficiently to effect a permanent bond between them and seal the edges in a fashion to provide a hermetically sealed chamber between the sheets. This method of heating the marginal portions of the sheets and spacers may well be resorted to in connection with the other forms shown in Figs. 2 and 3. The molten metal may be contained in a refractory receptacle R or the like.

In Fig. 5 we have illustrated another form of the invention wherein the marginal portions of both panes 5 or sheets of glass are metallized by dipping them into a bath of molten aluminium or similar metal and while hot are united with a glass or metal spacer 15 which has been similarly metallized. The three elements are pressed tightly together following the metallizing operation and thereafter annealed in the customary or any approved manner.

Modifications may be resorted to within the spirit and scope of the appended claims.

We claim:

1. A composite structure comprising two parallel flat sheets of glass spaced apart, a spacer extending along the marginal portions of said sheets and united with the adjacent inner surfaces thereof to hold the sheets apart and create therebetween a hermetically sealed chamber, and a coating for the spacer consisting of aluminium.

2. A composite structure comprising two parallel flat sheets of glass spaced apart, a spacer extending along the marginal portions of said sheets and united with the adjacent inner surfaces thereof to hold the sheets apart and create therebetween a hermetically sealed chamber, and a coating for the spacer consisting of an aluminium silicon alloy.

BENJAMIN F. HAZELTON, Jr.
WILLARD P. ZIMMERMAN.
MINOT K. HOLMES.